(12) United States Patent
Doll et al.

(10) Patent No.: US 11,878,736 B2
(45) Date of Patent: Jan. 23, 2024

(54) UNDERBODY STRUCTURAL ASSEMBLY

(71) Applicant: GM GLOBAL TECHNOLOGY OPERATIONS LLC, Detroit, MI (US)

(72) Inventors: Kurt W. Doll, Oxford, MI (US); Robert N. Saje, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 245 days.

(21) Appl. No.: 17/543,878

(22) Filed: Dec. 7, 2021

(65) Prior Publication Data

US 2023/0174164 A1 Jun. 8, 2023

(51) Int. Cl.
*B62D 25/20* (2006.01)
*B60K 1/04* (2019.01)
*B62D 65/02* (2006.01)
*B62D 27/06* (2006.01)

(52) U.S. Cl.
CPC ............... *B62D 25/20* (2013.01); *B60K 1/04* (2013.01); *B62D 27/065* (2013.01); *B62D 65/024* (2013.01); *B60K 2001/0438* (2013.01)

(58) Field of Classification Search
CPC .... B62D 25/20; B62D 27/065; B62D 65/024; B62D 25/2027; B60K 1/04; B60K 2001/0438; B60K 2001/0472

USPC .................................................. 296/193.07
See application file for complete search history.

(56) References Cited

U.S. PATENT DOCUMENTS

| 11,038,236 | B2* | 6/2021 | Montgomery | ...... H01M 50/244 |
| 11,104,390 | B2* | 8/2021 | Hermann | ............... B62D 27/02 |
| 11,400,986 | B2* | 8/2022 | Jeong | ................... B62D 25/025 |
| 11,691,492 | B2* | 7/2023 | Grosse | ..................... B60K 1/04 |
| | | | | 429/186 |
| 2021/0175480 | A1* | 6/2021 | White | ................. H01M 50/209 |

\* cited by examiner

*Primary Examiner* — Pinel E Romain
(74) *Attorney, Agent, or Firm* — CANTOR COLBURN LLP

(57) ABSTRACT

An assembly includes a first component having a first threaded opening therein, and a second component having a second component opening therethrough. A bolt assembly secures the second component relative to the first component. The bolt assembly includes a first bolt having a spacer portion and a first threaded shaft extending from the spacer portion to engage the first threaded opening. The first bolt includes an internal thread extending axially from the spacer portion. The bolt assembly further includes a second bolt having a head and a second threaded shaft extending from the head. The second threaded shaft extends through the second component opening to engage the internal thread of the first bolt to secure the second component relative to the first component.

20 Claims, 2 Drawing Sheets

UNDERBODY STRUCTURAL ASSEMBLY

The subject disclosure relates to vehicle assemblies, and in particular to vehicle assemblies that are underbody, sealed assemblies. In some vehicles, one or more underfloor storage compartments are defined, and one or more vehicle components may be located in the underfloor storage compartments, including, for example, rechargeable energy storage systems (RESS's), such as battery packs, or other components such as propulsion system storage tanks. Often, such components are contained in a component cover, that includes one or more structural members, such as stiffening beams built into the cover to stiffen the component structure and aid in locating the component to the mating structure of the vehicle. This structure, however, takes up considerable space underbody and is also relatively heavy. Alternative underbody compartment structures and component installation schemes would be appreciated in the art.

SUMMARY

In one embodiment, an assembly includes a first component having a first threaded opening therein, and a second component having a second component opening therethrough. A bolt assembly secures the second component relative to the first component. The bolt assembly includes a first bolt having a spacer portion and a first threaded shaft extending from the spacer portion to engage the first threaded opening. The first bolt includes an internal thread extending axially from the spacer portion. The bolt assembly further includes a second bolt having a head and a second threaded shaft extending from the head. The second threaded shaft extends through the second component opening to engage the internal thread of the first bolt to secure the second component relative to the first component.

Additionally or alternatively, in this or other embodiments the spacer portion is located between the first threaded opening and the second component opening.

Additionally or alternatively, in this or other embodiments the spacer portion includes a lobed engagement feature for installation of the first bolt into the first threaded opening of the first component.

Additionally or alternatively, in this or other embodiments a shoulder is defined between the first threaded shaft and the shoulder portion.

Additionally or alternatively, in this or other embodiments the shoulder abuts the first component.

Additionally or alternatively, in this or other embodiments the spacer portion is sealed to the second component.

Additionally or alternatively, in this or other embodiments the first bolt includes a seal groove located about the spacer portion and a seal element located in the seal groove. The seal element is compressed between the seal groove and the second component when the second bolt is installed in the first bolt.

In another embodiment, a floor assembly of a vehicle includes a floor panel, an underfloor tray positioned in a spaced apart relationship from the floor panel, a lateral beam located between the floor panel and the underfloor tray, and a bolt assembly securing the underfloor tray relative to the lateral beam. The bolt assembly includes a first bolt having a spacer portion and a first threaded shaft extending from the spacer portion to engage a first threaded opening in the lateral beam. The first bolt includes an internal thread extending axially from the spacer portion. A second bolt has a head and a second threaded shaft extending from the head. The second threaded shaft extends through an underfloor tray opening in the underfloor tray to engage the internal thread of the first bolt to secure the underfloor tray relative to the lateral beam.

Additionally or alternatively, in this or other embodiments the spacer portion is located between the first threaded opening and the underfloor tray opening.

Additionally or alternatively, in this or other embodiments the spacer portion includes a lobed engagement feature for installation of the first bolt into the first threaded opening of the lateral beam.

Additionally or alternatively, in this or other embodiments a shoulder is defined between the first threaded shaft and the shoulder portion.

Additionally or alternatively, in this or other embodiments the shoulder abuts the lateral beam.

Additionally or alternatively, in this or other embodiments the spacer portion is sealed to the underfloor tray.

Additionally or alternatively, in this or other embodiments the first bolt includes a seal groove located about the spacer portion and a seal element located in the seal groove. The seal element is compressed between the seal groove and the underfloor tray when the second bolt is installed in the first bolt.

Additionally or alternatively, in this or other embodiments a lateral stiffener is secured between the underfloor tray and the head of the second bolt.

Additionally or alternatively, in this or other embodiments the floor panel, the underfloor tray and the lateral beam define an underfloor chamber therebetween housing one or more components.

Additionally or alternatively, in this or other embodiments the one or more components includes one or more battery packs.

In yet another embodiment, a method of assembling a floor assembly of a vehicle includes providing a floor panel and a lateral beam extending from the floor panel, installing a first bolt of a bolt assembly into a threaded opening in the lateral beam, locating an underfloor tray in a spaced apart relationship from the floor panel, and installing a second bolt through an underfloor tray opening in the underfloor tray and into an internal thread of the first bolt, thus securing the underfloor tray relative to the lateral beam.

Additionally or alternatively, in this or other embodiments the first bolt is installed into the lateral beam via a lobed engagement feature in the first bolt.

Additionally or alternatively, in this or other embodiments a seal element is compressed between the first bolt and the underfloor tray via the installation of the second bolt.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
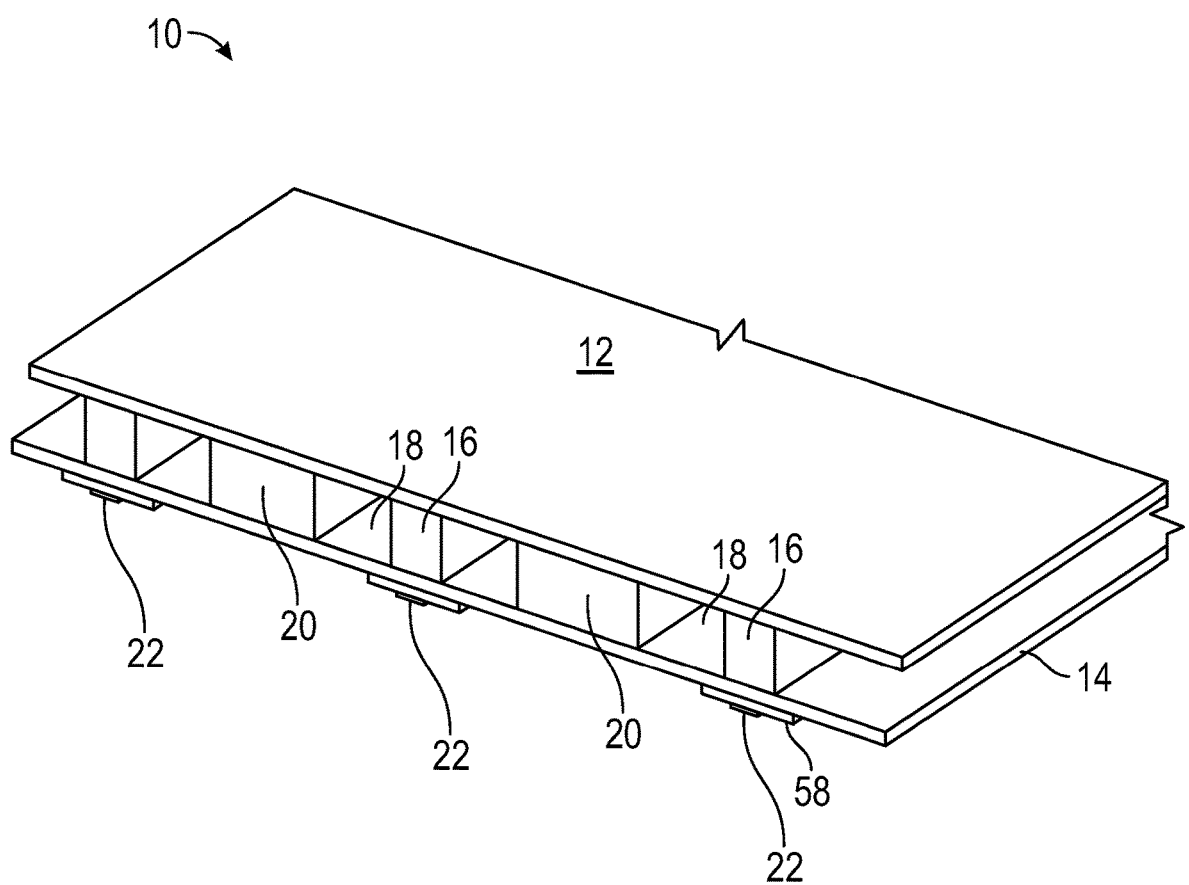
FIG. 1 is a schematic illustration of an embodiment of a floor assembly of a vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment, a floor assembly 10 for a vehicle is illustrated in FIG. 1. While the disclosure is presented in the context of the floor assembly 10, one skilled in the art will readily appreciate that the subject matter of the present disclosure may be applied to other applications and component assemblies. The floor assembly 10 includes a floor panel 12 and an underfloor tray 14 vertically below and spaced apart from the floor panel 12. One or more lateral beams 16 extend laterally across the floor assembly 10, and are located between the floor panel 12 and the underfloor tray 14. The lateral beams 16 are secured to the floor panel 12 by, for example, welding or by one or more other mechanical fasteners such as bolts. In some embodiments, the lateral beams 16 are formed from a metal material, such as a solid extruded aluminum or aluminum alloy material. Further, while lateral beams 16 are described herein, such an orientation is merely exemplary, and the beams 16 may be oriented to extend longitudinally or in another direction. One or more underfloor compartments 18 are defined between the floor panel 12, the underfloor tray 14 and the one or more lateral beams 16. A variety of vehicle components, such as battery packs 20 or other propulsion system components, may be installed in the underfloor compartments 18.

Figure 2:
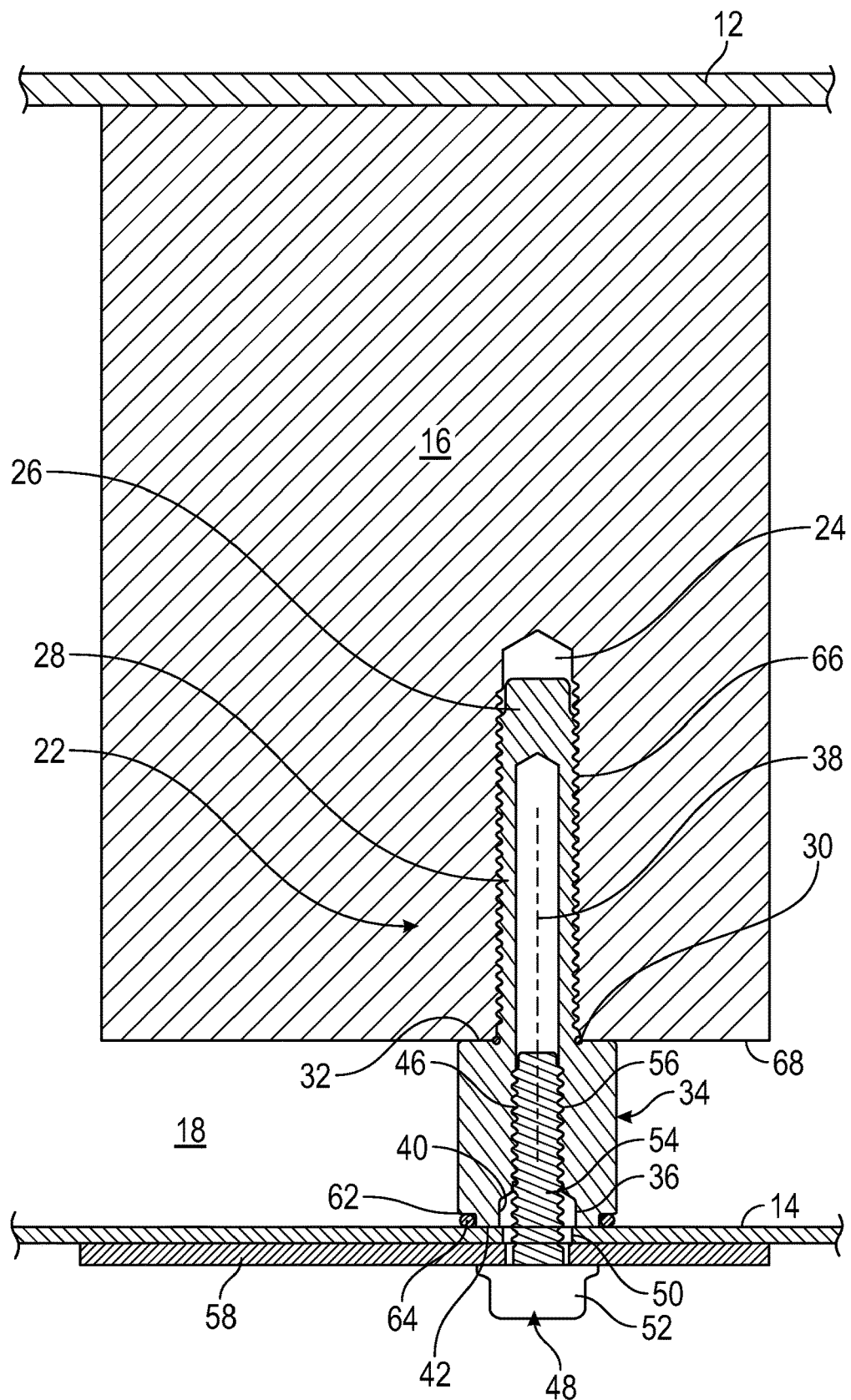
FIG. 2 is a partial cross-sectional illustration of an embodiment of a floor assembly of a vehicle.

Referring now to FIG. 2, illustrated is an exemplary embodiment of an attachment of the underfloor tray 14 to the lateral beams 16. As illustrated, the underfloor tray 14 is secured to the lateral beams 16 by a plurality of bolt assemblies 22. The lateral beams 16 include a threaded opening 24 for installation of a respective bolt assembly 22 of the plurality of bolt assemblies 22. The bolt assembly 22 includes a first bolt 26 installed into the threaded opening 24. The first bolt 26 includes a first external thread 66 along a first shaft 28 that is configured to engage with complimentary threads of the threaded opening 24. In some embodiments, the threaded opening 24 includes a chamfered lead in 30 to aid in locating the first bolt 26 into the threaded opening 24. The first bolt 26 includes a spacer portion 34 defining a shoulder 32. The shoulder 32 engages a beam outer surface 68 when the first bolt 26 is installed in the threaded opening 24. The spacer portion 34 includes a lobed engagement feature 36, such as a hex feature, located along a central axis 38 at an outer end 42 for engagement with a tool (not shown) to drive the first bolt 26 into the threaded opening 24. The lobed engagement feature 36 includes one or more side walls 40 extending from the outer end 42. An internal thread 46 extends axially into the first shaft 28 along the central axis 38 for installation of a second bolt 48, as will be described below.

The underfloor tray 14 includes a tray opening 50 through which the second bolt 48 is installed to secure the underfloor tray 14 to the lateral beam 16. The second bolt 48 includes a head 52 and a second shaft 54 extending from the head 52. The second shaft 54 includes threads 56, such that the second shaft 54 extends through the tray opening 50 and the threads 56 engage with the internal thread 46 of the first bolt 26 to retain the underfloor tray 14. In some embodiments, referring again to FIG. 1, the floor assembly 10 further includes one or more stiffener panels 58. The stiffener panels 58 extend laterally across the floor assembly 10 and are located locally at the locations of the bolt assemblies 22. The stiffener panels 58 provide support to the underfloor tray 14, especially with heavy battery packs 20 installed in the underfloor compartments 18.

Referring again to FIG. 2, in some embodiments, the underfloor compartments 18 are sealed to prevent ingress of water and other contaminants into the underfloor compartment 18, which could damage the vehicle components. To aid in the sealing, a seal groove 62 is located in the spacer portion 34, and a seal 64 is located in the seal groove 62. In some embodiments, the seal 64 is an O-ring seal extending around the central axis 38. The seal 64 engages with the underfloor tray 14 at an interior of the floor assembly 10 in compression when the second bolt 48 is installed to the first bolt 26, thus compressing the seal 64 between the seal groove 62 and the underfloor tray 14. The seal 64 thus prevents ingress of water or other contaminants into the underfloor compartments 18 through the tray opening 50.

The use of the bolt assembly 22 having the first bolt 26 and the second bolt 48 allows for pre-installation of the first bolt 26 to the lateral beams 16, which can improve fit and ease of assembly of the underfloor compartments 18, while ensuring the support of the underfloor tray 14. Further, locating the seal 64 at an interior of the floor assembly 10, rather than at an exterior of the floor assembly 14 provides for high integrity sealing in compression while keeping debris and impingement of operating vehicle environmental artifacts from impeding the performance of the sealing condition. The disclosed floor assembly 14 further provides reduction of part count, mass, cost, and assembly, by eliminating fasters count, passenger compartment floor, and lateral battery beam structural components.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An assembly comprising:
   a first component having a first threaded opening therein, and
   a second component having a second component opening therethrough;
   a bolt assembly securing the second component relative to the first component, the bolt assembly including:
      a first bolt having:
         a spacer portion; and
         a first threaded shaft extending from the spacer portion to engage the first threaded opening;
         wherein the first bolt includes an internal thread extending axially from the spacer portion; and
      a second bolt having:
         a head; and
         a second threaded shaft extending from the head, the second threaded shaft extending through the second component opening to engage the internal thread of the first bolt to secure the second component relative to the first component.

2. The assembly of claim 1, wherein the spacer portion is disposed between the first threaded opening and the second component opening.

3. The assembly of claim 1, wherein the spacer portion includes a lobed engagement feature for installation of the first bolt into the first threaded opening of the first component.

4. The assembly of claim 1, wherein a shoulder is defined between the first threaded shaft and the shoulder portion.

5. The assembly of claim 4, wherein the shoulder abuts the first component.

6. The assembly of claim 1, wherein the spacer portion is sealed to the second component.

7. The assembly of claim 6, wherein the first bolt includes:
a seal groove disposed about the spacer portion; and
a seal element disposed in the seal groove;
wherein the seal element is compressed between the seal groove and the second component when the second bolt is installed in the first bolt.

8. A floor assembly of a vehicle, comprising:
a floor panel;
an underfloor tray disposed in a spaced apart relationship from the floor panel;
a lateral beam located between the floor panel and the underfloor tray; and
a bolt assembly securing the underfloor tray relative to the lateral beam, the bolt assembly including:
a first bolt having:
a spacer portion; and
a first threaded shaft extending from the spacer portion, to engage a first threaded opening in the lateral beam;
wherein the first bolt includes an internal thread extending axially from the spacer portion; and
a second bolt having:
a head; and
a second threaded shaft extending from the head, the second threaded shaft extending through an underfloor tray opening in the underfloor tray, to engage the internal thread of the first bolt to secure the underfloor tray relative to the lateral beam.

9. The floor assembly of claim 8, wherein the spacer portion is disposed between the first threaded opening and the underfloor tray opening.

10. The floor assembly of claim 8, wherein the spacer portion includes a lobed engagement feature for installation of the first bolt into the first threaded opening of the lateral beam.

11. The floor assembly of claim 1, wherein a shoulder is defined between the first threaded shaft and the shoulder portion.

12. The floor assembly of claim 11, wherein the shoulder abuts the lateral beam.

13. The floor assembly of claim 8, wherein the spacer portion is sealed to the underfloor tray.

14. The floor assembly of claim 13, wherein the first bolt includes:
a seal groove disposed about the spacer portion; and
a seal element disposed in the seal groove;
wherein the seal element is compressed between the seal groove and the underfloor tray when the second bolt is installed in the first bolt.

15. The floor assembly of claim 8, further comprising a lateral stiffener secured between the underfloor tray and the head of the second bolt.

16. The floor assembly of claim 8, wherein the floor panel, the underfloor tray and the lateral beam define an underfloor chamber therebetween housing one or more components.

17. The floor assembly of claim 16, wherein the one or more components includes one or more battery packs.

18. A method of assembling a floor assembly of a vehicle, comprising:
providing a floor panel and a lateral beam extending from the floor panel;
installing a first bolt of a bolt assembly into a threaded opening in the lateral beam;
locating an underfloor tray in a spaced apart relationship from the floor panel; and
installing a second bolt through an underfloor tray opening in the underfloor tray and into an internal thread of the first bolt, thus securing the underfloor tray relative to the lateral beam.

19. The method of claim 18, further comprising installing the first bolt into the lateral beam via a lobed engagement feature in the first bolt.

20. The method of claim 18, further comprising compressing a seal element between the first bolt and the underfloor tray via the installation of the second bolt.

* * * * *